US008718932B1

(12) United States Patent
Pack et al.

(10) Patent No.: US 8,718,932 B1
(45) Date of Patent: May 6, 2014

(54) SNAPPING GPS TRACKS TO ROAD SEGMENTS

(75) Inventors: Jeremy B. Pack, Mountain View, CA (US); Abhijit S. Ogale, Mountain View, CA (US); Rodrigo L. Carceroni, Mountain View, CA (US)

(73) Assignee: Google Inc., Mountain View, CA (US)

( * ) Notice: Subject to any disclaimer, the term of this patent is extended or adjusted under 35 U.S.C. 154(b) by 6 days.

(21) Appl. No.: 13/223,203

(22) Filed: Aug. 31, 2011

Related U.S. Application Data

(60) Provisional application No. 61/492,076, filed on Jun. 1, 2011.

(51) Int. Cl.
*G01C 21/00* (2006.01)
*G01C 21/30* (2006.01)

(52) U.S. Cl.
CPC .............. *G01C 21/005* (2013.01); *G01C 21/30* (2013.01)
USPC .......................................... 701/447; 701/446

(58) Field of Classification Search
CPC .............................. G01C 21/005; G01C 21/30
USPC .......................................... 701/200, 447, 446
See application file for complete search history.

(56) References Cited

U.S. PATENT DOCUMENTS

| | | | | |
|---|---|---|---|---|
| 6,028,550 A * | 2/2000 | Froeberg et al. | ......... | 342/357.29 |
| 6,662,101 B2 * | 12/2003 | Adachi | ......... | 701/420 |
| 6,920,392 B2 * | 7/2005 | Adachi | ......... | 701/446 |
| 6,931,319 B2 * | 8/2005 | Adachi | ......... | 701/446 |
| 6,931,322 B2 * | 8/2005 | Jung et al. | ......... | 701/446 |
| 7,333,666 B2 * | 2/2008 | Adachi | ......... | 382/243 |
| 8,209,121 B1 | 6/2012 | Ogale | | |
| 2004/0204852 A1 * | 10/2004 | Robbins | ......... | 701/214 |
| 2006/0178809 A1 * | 8/2006 | Couckuyt et al. | ......... | 701/200 |
| 2011/0208426 A1 | 8/2011 | Zheng et al. | | |

OTHER PUBLICATIONS

Fletch, Garmin nuvi 750 Review, Feb. 21, 2008, GPSmagazine (GPSmagazine.com).*
Byun, S.H., et al., "Assessment of gps signal multipath interference," Jet Propulsion Laboratory, California Institute of Technology, Nasa, Jan. 30, 2002, pp. 1-15, can be retrieved at <URL: http://trs-new.jpl.nasa.gov/dspace/bitstream/2014/8084/1/02-0038.pdf>.
Google, "Google pose optimizer," 2011, 1 page, [online] [retrieved on Feb. 17, 2012] Retrieved from the internet <URL:http://code.google.com/p/gpo/>.

(Continued)

*Primary Examiner* — Mary Cheung
*Assistant Examiner* — Frederick Brushaber
(74) *Attorney, Agent, or Firm* — Fenwick & West LLP

(57) ABSTRACT

Methods and systems for snapping positions from location aware devices to road segments are provided. Data from the location aware device is received, which includes data about the location and direction of the location aware device. Each of the positions of the location aware device is snapped to a position on a road segment based on various factors, including the log likelihoods of snapping all of the previous positions of the location aware device to other possible positions on road segments, the comparison of direction of the location aware device and the direction of the road segment, and the distance between the location of the location aware device and the location of the road segment. Multiple threads can be generated to determine the most likely path for the location aware device. A most likely path of positions on road segments is determined for the location aware device and stored.

17 Claims, 13 Drawing Sheets

(56) References Cited

OTHER PUBLICATIONS

Herlihy, M., et al., "The Art of Multiprocessor Programming," Morgan Kaufmann, 2008.

Lymberopoulos, D., et al., "A sensory grammar for inferring behaviors in sensor networks," Proceedings of Information Processing in Sensor Networks, IPSN'06, Apr. 19-21, 2006, pp. 251-259.

Norris, J., "Markov Chains (Cambridge Series in Statistical and Probabilistic Mathematics)," Cambridge University Press, Cambridge, Uk, 1998.

Wenk, C., et al., "Addressing the Need for Map-Matching Speed: Localizing Global Curve-Matching Algorithms," Proceedings of the 18th International Conference on Scientific and Statistical Database Management (SSDBM'06), 2006, pp. 379-388.

Wikipedia, "Viterbi algorithm," last modified Jan. 28, 2012, 14 Pages, [online] [retrieved on Feb. 17, 2012] Retrieved from the internet <URL:http://en.wikipedia.org/wiki/Viterbi_algorithm>.

U.S. Appl. No. 11/870,265, filed Oct. 10, 2007, 29 Pages.

* cited by examiner

A)
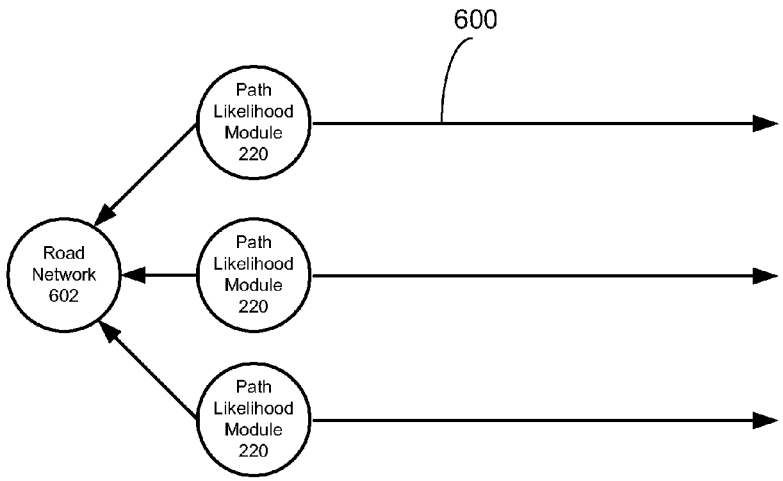
B)
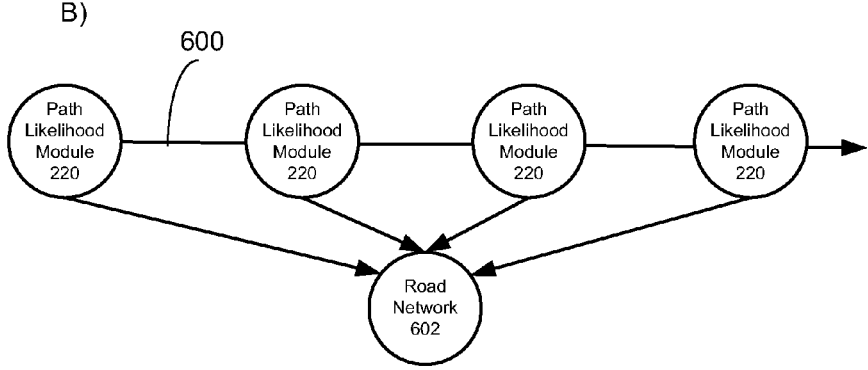
FIG. 6

SNAPPING GPS TRACKS TO ROAD SEGMENTS

BACKGROUND

1. Field of Invention

This disclosure relates generally to methods and systems for associating location data from location aware devices to road segment data in geographic information systems.

2. Description of the Related Art

Location aware devices are portable, electronic devices that can provide information about their current location. Location aware devices such as Global Navigation Satellite System (GNSS) devices communicate with satellites to determine the precise location of the location aware device. Location aware devices are commonly used in navigation and route guidance systems and have been included in a variety of consumer products ranging from vehicles to mobile devices. Location aware devices can provide useful information about the location and routes of users, as well as data about the position and direction of the location aware device on a given road.

Providers of maps and navigational services use the information received from the location aware device to generate directions and locale information to users. However, due to certain limitations in geographic data, the position of a location aware device can be mapped to a location that is up to 150 meters away from the actual position of the location aware device. In order to use the mapped location of the geographic data, it is important to accurately associate or "snap" the geographic position of a location aware device to the correct road segment. Conventional techniques have used methods to associate the geographic data to the road segment that is located closest in distance to the mapped position of the location aware device. However, association of geographic data to the closest road segment can produce inaccurate results. For example, the nearest road to the reported position of the location aware device may not be the actual road on which the location aware device traveled. Errors in associating geographic data to a road network can lead to inaccuracies in providing mapping and location-based services to users.

Conventional methods and systems are also limited in capacity and can only associate one track of a location aware device at a time to a road segment, which can be time-consuming and inefficient.

SUMMARY

Data received from a plurality of location-aware devices are associated or "snapped" to positions on road segments. For each of the plurality of geographic positions of a location track, the likelihood that a geographic position is snapped to a position on a road segment is determined using the likelihoods of snapping previous geographic positions of the location track to possible positions on the road segments. The most likely snapped position for the last geographic position on the location track is then determined using the likelihoods of snapping previous geographic positions on the location track to possible positions on the road segments. Next, a most likely path of positions on road segments for the geographic positions is determined using the most likely snapped position for the last geographic position on the location track. Then, the plurality of geographic positions on the location track are snapped to the most likely snapped positions on the most likely path of road segments and the snapped positions are stored.

Methods include determining the likelihood that a geographic position is snapped to a position on a road segment by comparing the heading of the geographic position and the heading of the position on the road segment. Determining the likelihood that a geographic position is snapped to a position on a road segment includes determining a likelihood of a change in position from a possible previous snapped position to a possible subsequent snapped position.

The method also includes executing multiple data processing threads in parallel for determining the likelihoods that a plurality of geographic positions are snapped to positions on road segments. A most likely path of positions on road segments for all of the geographic positions can be determined by combining the calculations of multiple threads on the location track.

The plurality of geographic positions can be snapped to the center of the width of the road segment. Alternatively, the snapping of each of the plurality of geographic positions to the road segment can be adjusted based on the width of the road segment.

In another embodiment, sensor data can be associated with the most likely snapped position on the road segment.

The features and advantages described in this summary and the following detailed description are not limiting. Many additional features and advantages will be apparent to one of ordinary skill in the art in view of the drawings, specification, and claims hereof.

BRIEF DESCRIPTION OF THE DRAWINGS

FIGS. 6A and 6B illustrate examples of parallelizing the method, in accordance with an embodiment of the invention.

The figures depict various embodiments for purposes of illustration only. One skilled in the art will readily recognize from the following discussion that alternative embodiments of the structures and methods illustrated herein may be employed without departing from the principles of the disclosure described herein.

DETAILED DESCRIPTION

Overview

Described herein are various embodiments of systems, methods, and computer-readable storage media for associating (or "snapping") geographic position data from location aware devices to road segments. The embodiments described herein will be discussed with respect to location aware device, such as Global Navigation Satellite System (GNSS devices), but it should be understood that other types of location aware devices, using non-GNSS type technologies may be used as well. Location aware devices can use information to determine location, such as location based services (LBS), including network-based, handset-based, SIM-based, and hybrid methods, using for example, triangulation, multilateration, cell or network identification, radio signal analysis, dead reckoning methods, including inertial navigation systems, or other non-geo-spatial satellite technologies.

Figure 1:
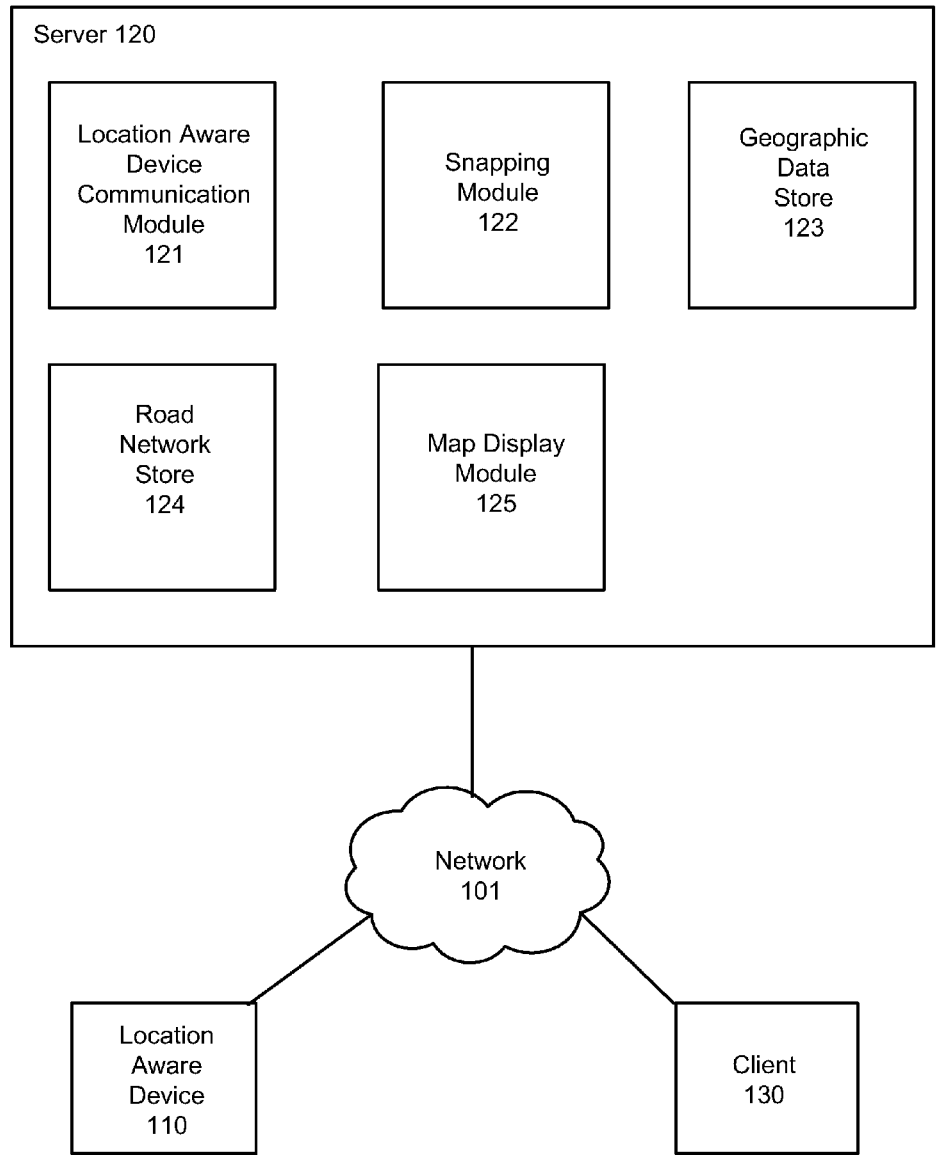
FIG. 1 is a high-level block diagram of a system environment, in accordance with an embodiment of the invention.

FIG. 1 is a block diagram of a system environment 100 in accordance with one embodiment. As illustrated in FIG. 1, the system environment 100 includes a network 101, at least one location aware device, such as a location aware device 110, a server 120, and a client 130. The server 120 includes a location aware device communication module 121, a snapping module 122, a geographic data store 123, a road network store 124, and a map display module 125.

The network 101 represents the communication pathways between the server 120 and the location aware devices 110. In one embodiment, the network 101 is the Internet and uses standard communications technologies and/or protocols. The network 101 can also utilize dedicated, custom, or private communications links that are not necessarily part of the Internet.

The system environment 100 includes at least one location aware device 110. A location aware device 110 can be a mobile device with GNSS or a vehicle with a GNSS receiver. The mobile device with GNSS 110 can be any mobile device equipped with GNSS, such as a smart phone or personal digital assistant (PDA), or a dedicated GNSS receiver/transmitter. A vehicle with GNSS 110 can be any vehicle equipped with a GNSS receiver (either OEM or after-market), such as a car, truck, motorcycle, bus, or fleet vehicle. FIG. 1 illustrates a location aware device 110 for clarity; in practice, there will be hundreds and likely thousands of location aware devices 110 from which geographic data is received.

In an illustrated embodiment, the location aware devices 110 include a GNSS receiver chipset. The GNSS receiver chipset receives several sources of differential signals, such as a wide-area augmentation system (WAAS), subscription L-Band signals, or a combination of signal options. The location aware device 110 includes an antenna that is tuned to the frequencies transmitted by satellites, receiver-processors, and a highly stable clock. The location aware device 110 may include a display for providing location and speed information to the user.

The term "location aware device" refers to devices that communicate their location and/or direction of travel through geo-spatial position satellites. For example, a mobile device, vehicle, or other transportation unit can serve as a location aware device using any of the Global Positioning System (GPS), the GLONASS system (a Russian radio-based satellite navigation system), the Chinese COMPASS and BeiDou navigation systems, the Galileo positioning system of the European Union (EU), or the Indian Regional Navigational Satellite System of India.

The location aware device communication module 121 communicates with a plurality of location aware devices 110 and receives data from the plurality of location aware devices 110. Data received from a location aware device 110 can include data about the geographic position (e.g., latitude and longitude) and direction of travel (e.g., heading) of the location aware device 110. The location aware device communication module 121 can be configured to receive data from various types of location aware devices 110. The geographic position data includes the latitude and longitude of the location aware device 110. The direction of travel of the location aware device 110 may be relative to points on a fixed compass, such as cardinal points (north, south, east and west) or intermediate directions (northeast, southeast, southwest, northwest) or headings. Alternatively, the direction data may include information about the degrees of rotation relative to a 360 degree compass. For instance, a location aware device 110 heading directly east can correspond to a direction of 90 degrees.

The location aware device communication module 121 can receive the data from location aware devices 110 at regular intervals. The regular intervals can be anywhere from several times a second (e.g., 5 or 10 Hz), to once per second, once every few seconds, once per minute, or other intervals of time. Alternatively, the data is received according a specific upload pattern; for example, the location aware device communication module 121 can receive data from a vehicle after every 100 meters traveled by the vehicle. In some embodiments, the data is collected in short intervals or bursts, such that there is a dense sampling of data in a short time period. In another example, the data is received at a faster rate than the rate that data is sent back to the location aware device 110. The operations of data collection can be repeated with respect to a large number of location aware devices 110 over an extended period of time, such as an hour, a day, a week, etc., depending on the particular application for which the collected information is to be used. In addition, a large sample of data can be collected and stored from multiple location aware devices 110, and then subsequently snapped to road segments. Similarly, multiple threads can be operating concurrently to collect, analyze, and store the data.

Users of the location aware devices 110 can choose to opt out of the data collection process by declining to send data from the location aware device 110. In some cases, the data from the location aware device 110 is removed of any identifying information that links the data to the particular location aware device 110.

The data received from a location aware device 110 may also be associated with sensor data related to the location of the location aware device 110. Sensor data can include photographic images of the location, which images are captured from known geographic locations on the roads described by the road network data. For example, the photographic images may be captured by a vehicle fitted with cameras that takes images as the vehicle travels on roads. The images show the visual environment of the roads from the perspective of a person travelling on the roads. In one embodiment, the street view imagery is captured by specially-equipped vehicles that travel along the roads and capture images from multiple perspectives. The images are tagged with location information describing the geographic locations from which the images were captured. The images from a single location can be combined to provide a 360 degree panorama of the environment from that location on the road. Other types of sensor data can include data from inertial measurement devices (accelerometers, gyroscopes), data from vehicle wheel motion, laser range data (which provides distance information from the vehicle to the surrounding objects), and data gathered from a nearby Wi-Fi or cell tower. The sensor data can be stored with the associated geographic position data in the data store 123.

The location aware device communication module 121 sends the geographic data to the snapping module 122 for processing. The snapping module 122 snaps the geographic data from a particular position to a road segment, and is one means for performing this function. "Snapping" is a term used to describe the association or mapping of a position of a location aware device 110 to a position on a road segment. The association serves to establish which geographic data are associated with which roads or pathways, thereby building up a collection of data that can be used to characterize travel along such roads. Details about the snapping module 122 are described in relation to FIG. 2.

A road segment is a portion of a road between two points. The points can be adjacent intersections, or points at fixed distances (e.g., 100 meters); in addition, multiple different types of road segment can be used. A road segment can includes a portion or all of a walking path, biking path, transportation route, roadway or highway. The road segment can be associated with a heading and/or various traffic rules and restrictions (e.g., one way road, two way road, etc.).

A given road segment passes through a plurality of positions with latitude and longitude coordinates. These positions on the road segment can be used for snapping to geographic positions in location tracks. For example, a road segment that is 50 meters long can include ten positions that are equally spaced within the road segment (e.g., each position on the road segment is five meters apart), and each position can be assessed for snapping to a geographic position in a location track.

The location aware device communication module 121 sends geographic data to the geographic data store 123. The locations of the location aware device 110 can also be compiled by the snapping module 122 and stored as a location track in the data store 123.

The server 120 also includes a road network store 124. The road network store 124 maintains a road network graph, which includes data about the location and layout of roads. The road network store 124 can store road segments as well information associating sensor data with the road segments. In some embodiments, the road network store 124 includes additional data about the roads, such as the direction of travel on the roads (e.g., one-way or two-way travel), turn restrictions, traffic rule information, and the like.

The map display module 125 is configured to provide a graphical display of the portions of road network and associated location tracks. The road network and associated location tracks can be provided to a client 130 for display. Examples of such displays are shown in FIGS. 8-13.

The client 130 is a computer or other electronic device used by one or more users to perform activities including viewing the road network and associated location tracks. In practice, there are multiple clients 130 in communication with the server 120, and each client 130 is used by a different user to view the road network and associated location tracks. In some embodiments, the user can view and analyze the displayed data to provide direction and map information.

Figure 2:
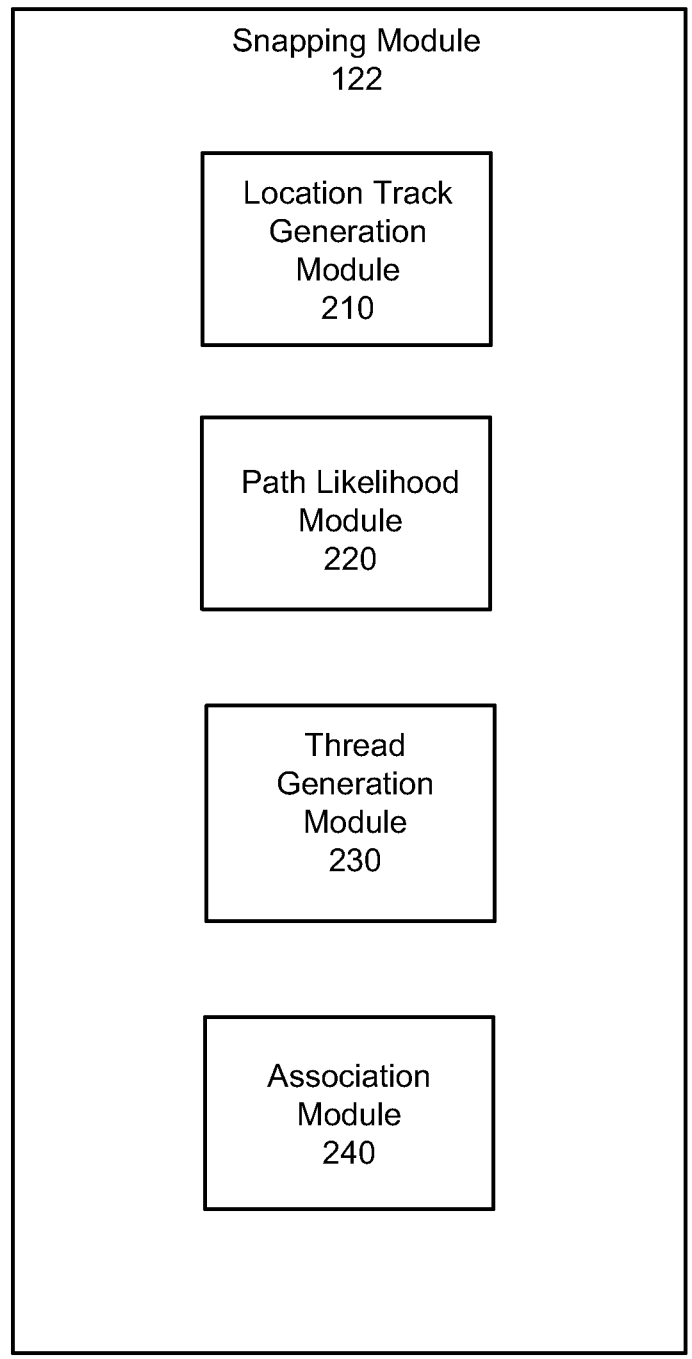
FIG. 2 is a high-level block diagram of a snapping module, in accordance with an embodiment of the invention.

FIG. 2 illustrates the snapping module 122. The snapping module 122 includes a location track generation module 210, a path likelihood module 220, a thread generation module 230, and an association module 240.

The location track generation module 210 processes the geographic data into a location track. The location track generation module 210 analyzes the plurality of positions of a location aware device 110 and connects the positional data into a path traveled by the location aware device 110. The location track generation module 210 can also use the direction of travel of the location aware device 110 to determine the direction of the track. The location track generation module 210 can create location tracks for a plurality of samples of geographic data. The path likelihood module 220 snaps a geographic position from a location track to a position on a road segment, and is one means for performing this function. The path likelihood module 220 can be implemented using various different approaches. In one embodiment, the path likelihood module 220 implements the Viterbi algorithm to snap positions to road segments. The Viterbi algorithm is a Hidden Markov Model algorithm that attempts to determine the most likely set of states given a set of observations. In general, the Viterbi algorithm finds the most likely sequence of hidden states (called the Viterbi path) that results in a sequence of observed events. The algorithm operates under the following assumptions: (1) Both the observed events (here, the location track data) and hidden events (the road segment positions) must be in a sequence (this sequence often corresponds to time); (2) These two sequences need to be aligned, and an instance of an observed event (geographic position from a location track) corresponds to exactly one instance of a hidden event (position on a road segment); (3) Computing the most likely hidden sequence up to a certain point t must depend only on the observed event at point t, and the most likely sequence at point t−1. These assumptions are all satisfied in a first-order hidden Markov model in general, and are satisfied by the location track data and road segment positions.

The path likelihood module 220 implements the Viterbi algorithm to determine the most likely path of positions on road segments to snap to geographic positions on a location track. The path likelihood module 220 can use the following steps to determine where to snap each geographic position to the road graph network.

(1) Determine all possible positions on road segments for Position 1
(2) for i=2:N,
  (a) Determine all possible positions on road segments for Position i;
  (b) Determine transition likelihoods between snapped positions for Position i and Position i−1;
  (c) Determine a most likely path to each snapped position for Position i;
  (d) Delete unlikely paths;
(3) Determine most likely final snapped position for Position N;
(4) Delete unused paths.

Step 2(a) is a recursive step. The path likelihood module 220 organizes the possible paths in a graph structure.

For example, the path likelihood module 220 begins by selecting a first position P1 of the location track. The position of the location aware device 110 has a latitude and longitude and an associated heading. The path likelihood module 220 determines a candidate list of all possible road segments that can be snapped to the position P1. The candidate list of possible positions on road segments can include all positions within a given radius distance from the position P1. For example, the radius can be set from 20 to 200 meters from the position P1; the larger the radius the larger the number of candidates to evaluate.

Next, the path likelihood module 220 selects the subsequent position (P2) on the location track. The path likelihood module 220 determines a candidate list of all possible positions on road segments that can be snapped to position P2.

For each possible position on a road segment for position P2, the path likelihood module 220 determines which position for P1 would be the most likely previous position for the location aware device 110.

Then, a subsequent position on the location track, position P3, is selected. A candidate list of positions on road segments for position P3 is generated. For each of the possible positions for P3, the path likelihood module 220 determines the most likely preceding position for P2. Next, for each of the positions for P2, the path likelihood module 220 calculates the most likely preceding position for P1. Thus, given any position for P3, the most likely positions for P2 and P1 are determined. The likelihoods for each of the preceding positions and the most likely positions for each geographic position are stored in the geographic data store 123.

This process is repeated for each of the subsequent positions on the location track up to the last position, $P_N$. The path likelihood module 220 determines the most likely final position for $P_N$. The most likely path for all the positions on the road segment path is determined by looking at the most likely position for $P_N$, which is based on the most likely position for the preceding point, and proceeding recursively back to P1. To select the most likely position for $P_N$, the path likelihood module 220 determines the probability of each possible position on a road segment for $P_N$, which is the likelihood of a snapped position for $P_N$ plus the likelihood of all of the preceding snapped positions and all of the transition likelihoods along the most likely preceding path.

The transition likelihood in step 2(b) is determined from the log likelihood that a given position on a road segment is the correct position to snap to a geographic position. A Gaussian distribution is used to calculate and compare the log likelihoods of various positions.

In some embodiments, the path likelihood module 220 can determine the log likelihood based on the heading of the location aware device 110 at a position Pi, a likelihood of a previous snapped position (Pi−1) to a position on a road segment, and a likelihood of the transition from a previously snapped position on a segment (Xi) to the next position on a segment (Xi+1). In one embodiment, the log likelihoods of the candidate positions on road segments for a given geographic position can be normalized to sum to 1.

In determining the most likely snapped position on a road segment, the path likelihood module 220 can consider the following factors. Each factor in the log likelihood calculation can be weighted using arbitrary weights.

(i) Distance: The likelihood that a geographic position is snapped to a position on a road segment at a given distance from the geographic position. For example, if the possible snapped position on the road segment is close in distance to the geographic position, then there is a high likelihood that the geographic position should be snapped to the position on the road segment. A Gaussian distribution is used to determine the likelihood.

(ii) Heading differential: the likelihood that a position with a given heading is snapped to a road segment with a given heading. For example, if a possible snapped position has the same heading as the geographic position, then there is a high likelihood that the possible snapped position and the geographic position should be snapped together. A Gaussian distribution is also used to determine the likelihood of the heading differential.

(iii) Relative position change: the likelihood of the given change from the previous snapped position to the next possible snapped position, given the change in the corresponding positions. A Gaussian distribution is used to determine the likelihood of the relative position change.

(iv) The likelihood of a subsequent snapped position being on a given road segment. A connectivity guarantee is used: given that a snapped position is on Segment A, the likelihood that the next snapped position is on Segment B is determined. If Segment A and Segment B are connected to each other, this likelihood is high. If Segment A and B are not connected to each other on the road graph, the likelihood is low. The following indicators can also be considered:
 (a) two adjacent positions on the same segment, heading in the direction of the segment, has a high likelihood;
 (b) one position on an intersection, and the next position on a successor segment has a high likelihood;
 (c) two positions on adjacent segments, with an intersection in between, has a lower likelihood;
 (d) two positions on nearby segments have a lower likelihood, depending on how many turns occur between them (e.g., how many segments are between the segments).

(v) Road network legalities (or road graph traversal), such as traffic restrictions (e.g., one-way streets, traffic maneuvers, prohibited turns). The direction of travel on the road segment should match the heading of the geographic position and should not violate traffic rules associated with the snapped road segment. For example, if a geographic position has a heading of directly west, and the position on the road segment has a road network legality that requires travel only in the easterly direction, it is not likely that the geographic position should be snapped to the road segment.

Figure 3:
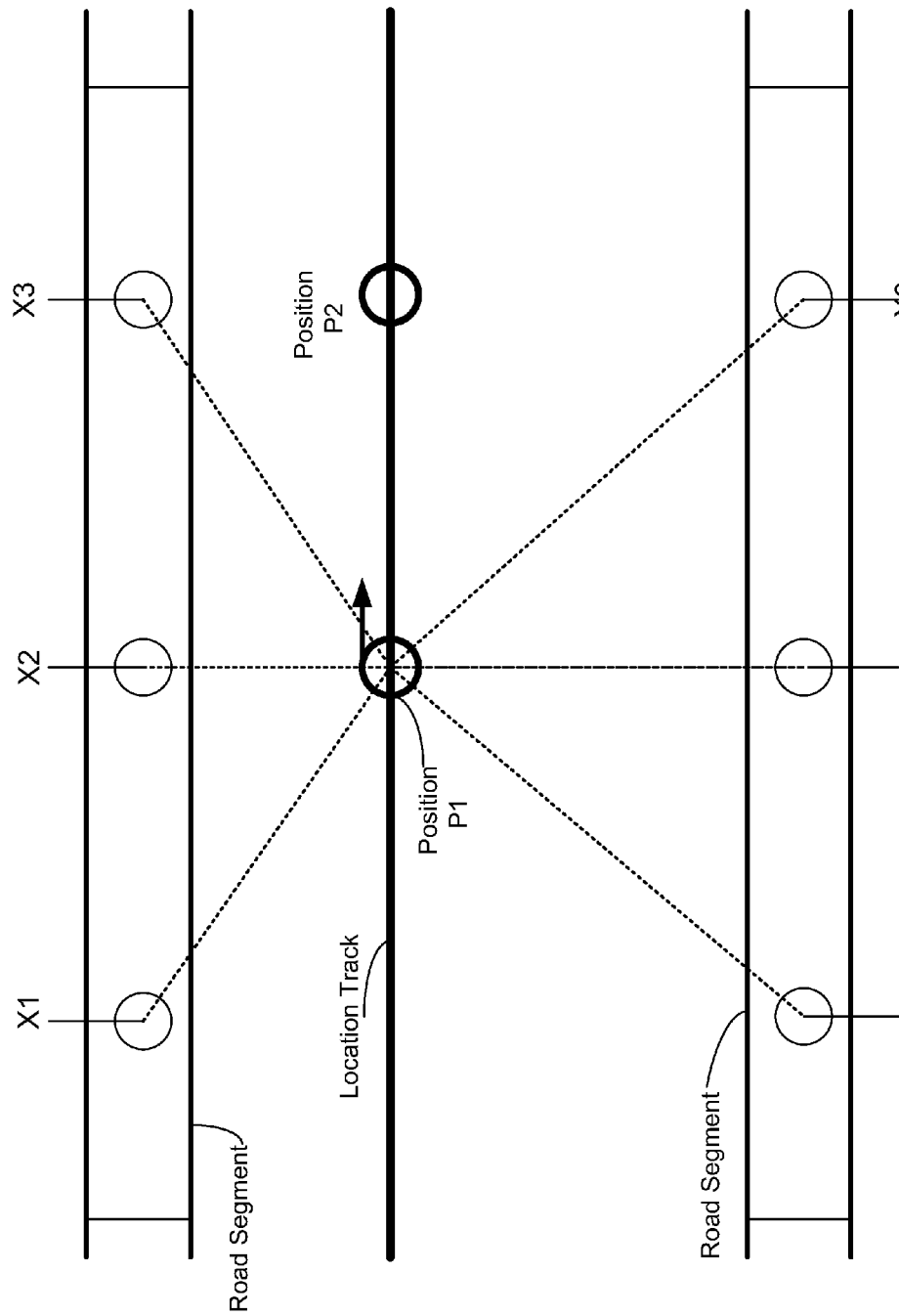
FIG. 3 is a high-level block diagram of positions on a location track and positions on road segments, in accordance with an embodiment of the invention.

FIG. 3 shows an example geographic position P1 on a location track. Position P1 has a latitude, a longitude, and a heading (e.g., west). The position P1 is located near two road segments that can be snapped to the position. Each road segment comprises a plurality of positions (e.g., X1, X2, X3, X4, X5, X6), and each position has a latitude, a longitude and a heading. The positions on the road segment may be separated by a pre-determined distance, e.g., 5 or 10 meters.

Figure 4:
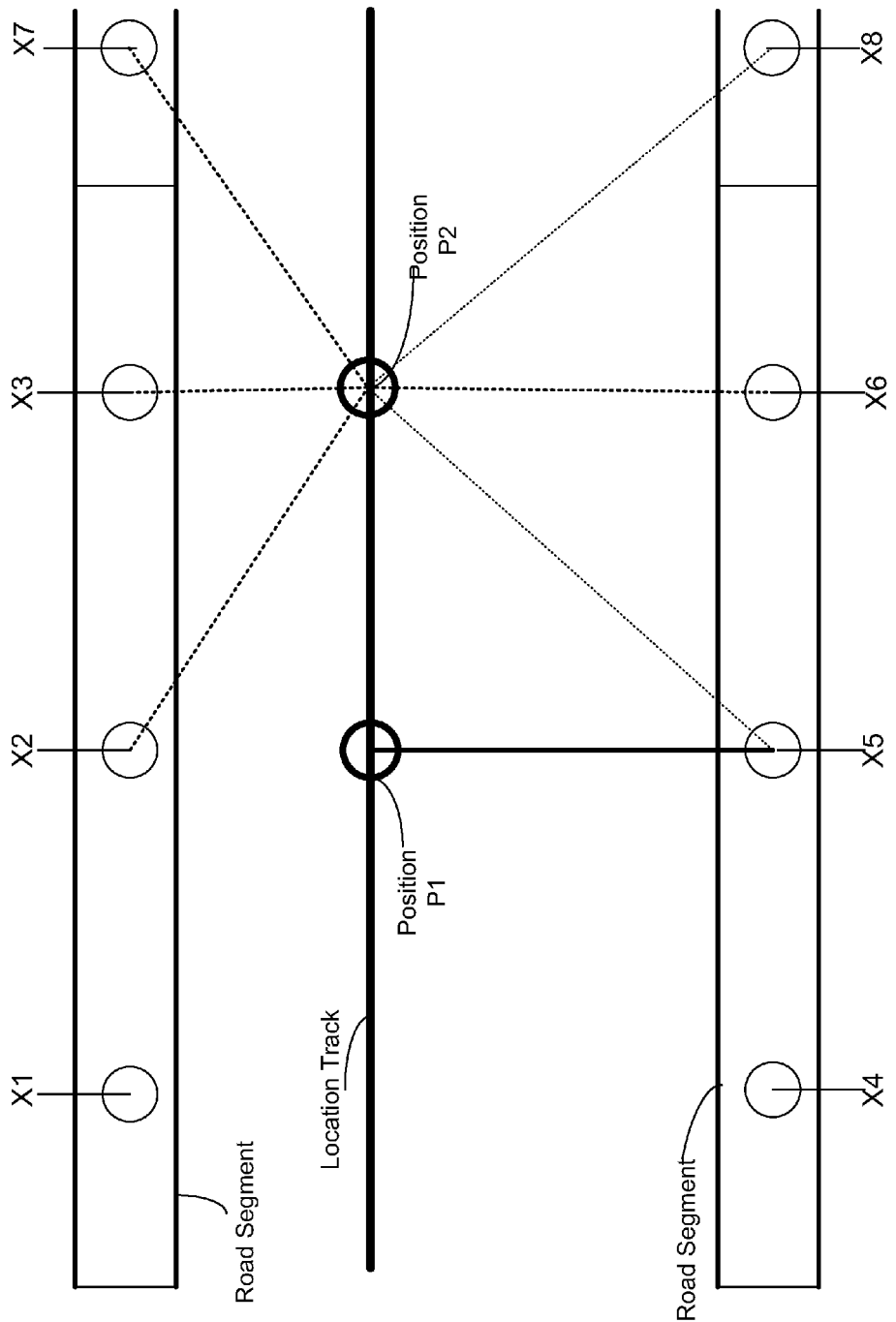
FIG. 4 is a high-level block diagram of positions on a location track and positions on road segments, in accordance with an embodiment of the invention.

A candidate list of possible snapped positions on road segments is generated for P1: $C_{P1}$={X1, X2, X3, X4, X5, X6}. Next, as shown in FIG. 4, a subsequent position on the location track (P2) is selected. A candidate list of possible road segments is generated for P2: $C_{P2}$={X2, X3, X5, X6, X7, X8}. For each possible position on a road segment for P2, the path likelihood module 220 determines the most likely position for P1 that would precede P2. For instance, given a possible snapped position X6 for P2, a log likelihood can be calculated for each possible positions for P1={X1, X2, X3, X4, X5}, using the factors described above. For position X6, the log likelihood for each of the possible positions for P1{X1, X2, X3, X4, X5} could be {0.1, 0.1, 0.1, 0.1, 0.6}, respectively. In that case, X5 would be the most likely position for P1, given X6 is chosen as a position for P2. The log likelihood is calculated for each possible position on a road segment for P2. The most likely position on a road segment is selected for P2 using the most likely previous position for P1.

Thus, the function for determining the most likely position on a road segment for each geographic position is (using log likelihoods):

$$f=l(\text{position})+l(\text{heading})+l(\text{transition})$$

where:

$$l(\text{transition})=l(\text{position change})+l(\text{road graph traversal})$$

$$l(g)=\ln(lik(g)).$$

Referring back to FIG. 2, the association module 240 stores the most likely position on a road segment for each of the positions on the location track and stores the most likely path for the location aware device 110.

Figure 5:
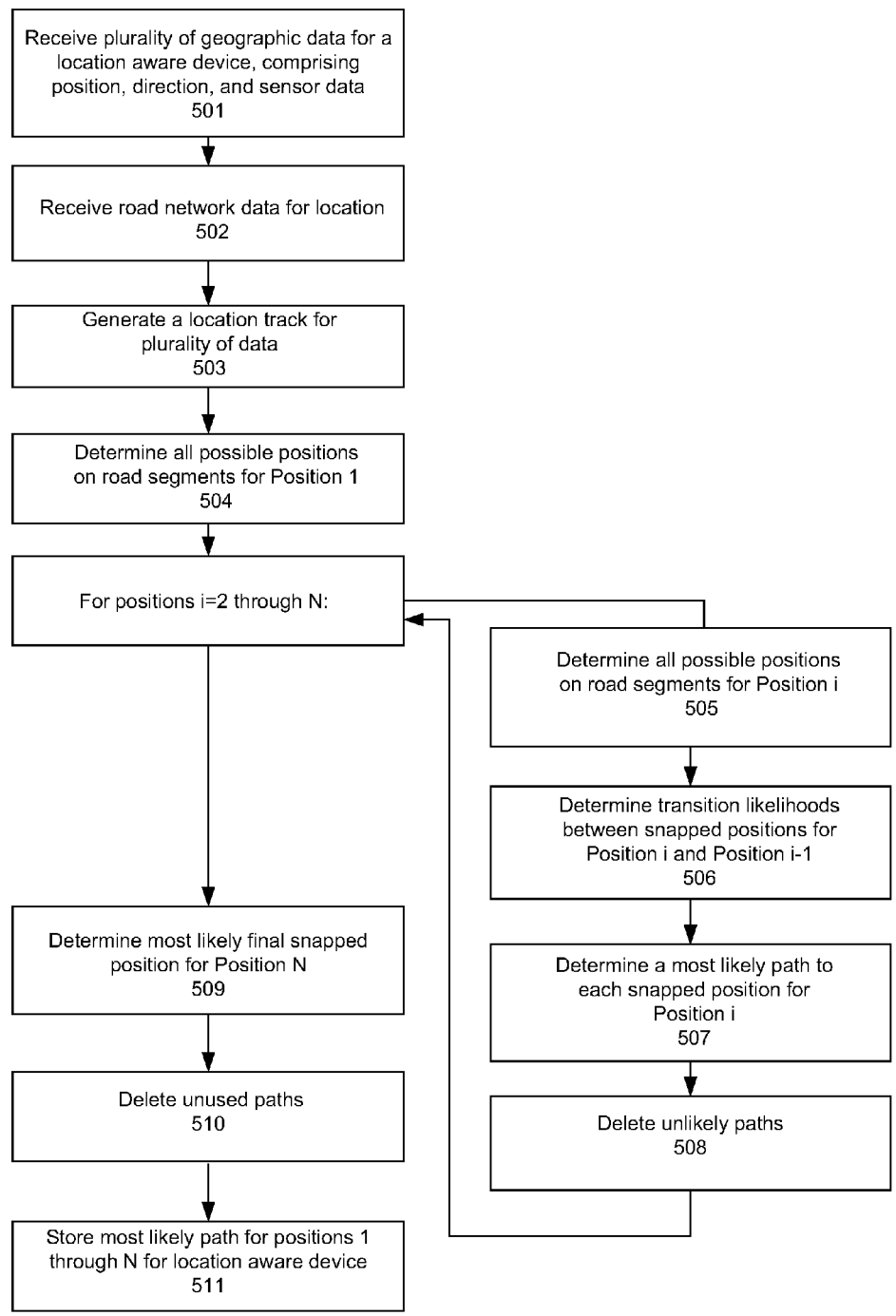
FIG. 5 is a flow chart illustrating the steps of the method, in accordance with an embodiment of the invention.

The path likelihood module 220 can snap positions of a location aware device 110 in a serial manner. FIG. 5 illustrates the steps for performing the method in a serial manner. The snapping module 122 receives 501 a plurality of geographic data for a location aware device 110. The snapping module 122 receives 502 road network data for the location of the geographic data. The road network data can be retrieved from the road network store 124. The location track generation module 210 then generates 503 a location track for the plurality of geographic data. The path likelihood module 220 determines 504 all possible positions on road segments for a first position on the location track, Position 1. Next, for positions i=2 through N, the path likelihood module 220 determines 505 all possible positions on road segments for Position i, determines 506 the transition likelihoods between snapped positions for Position i and Position i−1, and determines 507 a most likely path to each snapped position for Position i. The path likelihood module 220 can snap the geographic positions in such a way as to reuse the stored road network data as much as possible (e.g., where the road graph is too large to fit in memory). The path likelihood module 220 deletes 508 all unlikely paths and determines 509 the most likely final snapped position for Position N. The path likelihood module 220 deletes 510 unused paths and stores 511 the most likely path for positions 1 through N for the location aware device 110.

Parallelizing the Viterbi Algorithm

In order to achieve faster computation, the thread generation module 230 parallelizes the Viterbi algorithm by instantiating multiple threads for the path likelihood module 220. A thread is one instance of execution of the path likelihood module 220 for calculating the snapping and transition likelihoods for a location track.

In one embodiment, the thread generation module 230 generates a thread for each of a plurality of location tracks 600 at once, as shown in FIG. 6A, providing each of these to an instance of the path likelihood module 220. Each track 600 can share a road network graph 602 (spatial index), which decreases storage (RAM) requirements and offers linear speedups.

In another embodiment, the thread generation module 230 generates multiple threads within one location track 600, by partition the track into multiple portions, and providing each portion to an instance of path likelihood module 220, and then combining the results into a single track 600. FIG. 6B shows an example of the multiple threads that can be generated on a single track 600. This process requires storing extra data, which can make a linear speed up difficult.

Figure 7:
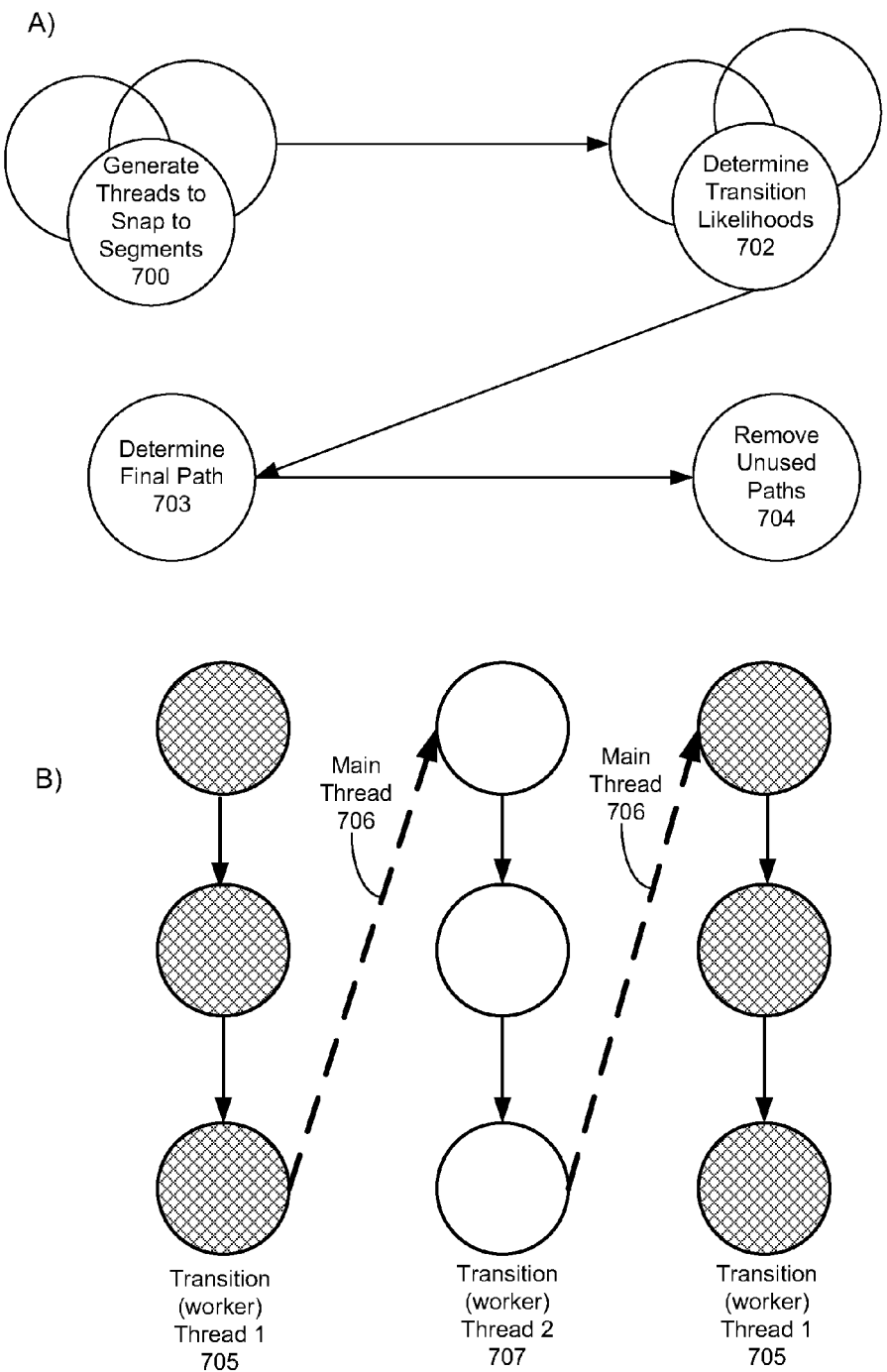
FIGS. 7A and 7B illustrate examples of parallelizing the method, in accordance with an embodiment of the invention.

In yet another embodiment, the thread generation module 230 uses a dynamic four-stage pipeline, as shown in FIG. 7A. First, the thread generation module 230 generates 700 threads to snap positions to segments. Next, multiple other threads determine 702 the transition likelihoods for the identified positions. Third, the final path is determined 703 sequentially, when the transition threads are completed. Fourth, the unused paths are removed 704.

As shown in FIG. 7B, the thread generation module 230 uses two thread types to parallelize the method: worker threads 705, 707 and a main thread 706. The worker threads 705, 707 calculate all snapped positions and a dynamic percentage of transitions, depending on the speed of the main thread 706. When the possible snapped positions and transitions are sent from the worker thread 705, 707 back to the main thread 706, the current progress of the main thread 706 is assessed. If the worker thread 705, 707 is far ahead of the main thread 706, the worker thread 705, 707 increases the percentage of transitions. If the main thread 706 must wait for input from the worker thread 705, 707, then the worker thread 705, 707 lowers the percentage of transitions. The main thread 706 calculates the final path and any transition calculations left incomplete by the worker threads 705, 707. FIG. 7B illustrates a diagram of the process with two transition threads 705, 707 and a block size of three positions. Each thread computes the possible snapped positions for three positions at a time. The transitions between blocks are computed by the main thread 706, whereas the transitions within blocks are computed by the transition threads 705, 707, except in the last set of three, where one transition is computed by the main thread 706.

A transition retriever acts as the interface between the main thread 706 and the transition threads 705, 707 and retrieves the possible snapped positions and transitions for the next position when queried by the main thread 706. The transition retriever also allows transition threads for future location tracks to start as soon as its own transition threads finish. During the sequential parts of the snapping for a single GPS track, future data is calculated for the next track.

Each transition thread has two data structures. The first is a list of already processed snapped positions and transitions, and is protected by a mutex lock. Mutual exclusion (often abbreviated to mutex) algorithms are used in concurrent programming to avoid the simultaneous use of a common resource, such as a global variable, by pieces of computer code called critical sections. A critical section is a piece of code in which a process or thread accesses a common resource. The critical section by itself is not a mechanism or algorithm for mutual exclusion. A program, process, or thread can have the critical section in it without any mechanism or algorithm which implements mutual exclusion. A mutex is also a common name for a program object that negotiates mutual exclusion among threads, also called a lock. Of the two data structures, one structure is shared between threads and accessed rarely, and another structure is not shared and is accessed often. This means that the mutex is rarely locked, when the shared data structure is accessed.

The mutex is locked before new data is added. When the transition retriever requests processed data, it again locks this structure, but then (by exchanging pointers) moves all of the information to a separate data structure, that is still within the transition thread 705, 707, but is only used by the transition retriever, and thus is not mutex-protected. This allows the transition retriever to only need to lock the processed data mutex when the currently "read" list is empty.

When the transition retriever retrieves processed data, the transition thread 705, 707 sets a value to show much data was transferred. By adding this value to the current size of the processed list, the transition thread 705, 707 can have an estimate of how far behind the main thread 706 is from the current transition thread 705, 707. If the main thread 706 is very close, then the transition thread 705, 707 calculates fewer transitions. The determination of whether the main thread 706 is very close is set dynamically by the thread generation module 230, depending on how many processor cores are being used. Generally, a main thread is considered to be very close if it is within 30 snapped positions.

If the main thread 706 is far behind, i.e., more than 30 snapped positions away, the transition retriever calculates almost all of the transitions or sleeps. For example, two worker threads 705, 707 each process various tasks. The first worker thread 705 processes geographic positions X0-X4, and the second worker thread 707 processes geographic positions X5-X9. The first worker thread 705, based on its information about geographic positions X0-X4, can calculate transitions between geographic positions X0:X1, X1:X2, X2:X3, X3:X4, whereas the second worker thread 707 can calculate transitions between X5:X6, X6:X7, X7:X8, X8:X9. Neither of the worker threads 705, 707 has enough information to calculate the transition between X4:X5. Thus, the two worker threads 705, 707 cannot calculate all of the transitions between them. The main thread 706 must calculate the remaining transitions, e.g., the X4:X5 transition. The main thread 706 always calculates the transitions between block borders. The block size must be larger than the number of threads, or else the main thread 706 would have more work than any worker thread 705, 707.

The main thread 706 creates a transition retriever, which creates the transition threads 705, 707, and then returns to the main thread 706. The main thread 706 then executes the path likelihood module 220 as usual, but retrieves snapping and transition information from the transition retriever. When transitions have not been completed for a position, they are computed in the main thread 706. When transitions have not been completed for a position, they are computed in the main thread 706. Once all of the transitions have been retrieved, the transition threads 705, 707 will have all exited. For the remaining serial work to do in the main thread 706, new transition threads can work on the next location track while the serial execution is completing.

Whenever mutexes are locked on the shared data structures protecting the queues in the pipeline, the only operations protected by the mutexes are a small number of pointer swaps. Linked lists are swapped, which makes the critical sections very short. A number of mutexes are locked and unlocked as the algorithm begins, but once the process begins, there are usually less than two mutex locks per block, since the main thread 706 can retrieve multiple blocks at a single time if they are available, and the data structure is only locked once per block by the transition threads. Given that a standard running speed is 1000 points per second for four threads:

1000(points/second)/(20 points/block)*2 mutexes/block=100 mutexes/second

These one hundred mutex locks per second are spread between the various threads. Once again, this is the upper bound except in pathological cases, with 50 mutexes/second being the lower bound. For optimal performance, the block size is increased as more threads are added, since the main thread 706 must calculate all transitions between block boundaries. This can be avoided by adding one or more intermediate threads (similar to the four-stage pipeline) that handle these extra transitions.

The speed of the Viterbi algorithm can be much improved by removing unlikely paths as early as possible. During the snapping, transition calculation and final path determination steps, there are many opportunities to remove unlikely paths.

Optimization: Relaxing the Viterbi Algorithm

In some embodiments, snapping performed by the path likelihood module 220 can be relaxed. Typically, the position of the location aware device 110 is snapped to the middle of the width of the road segment. In some cases, snapping the position to the middle of the road segment snaps the position of the location aware device 110 to the wrong location.

In some embodiments, a calculation is performed for adjusting each snapped position with regards to the road width. This calculation shifts the snapped position to fit with the road. In other cases, there may be a need to snap to positions in between the set positions on the road segment. There may also be a need to remove detours on the location track (e.g., a location aware device 110 making a turn into a driveway or parking lot).

The following formula is used to preserve the overall curvature of the road track.

$$F(\text{position}) = \text{Sum}(\log \text{likelihood}(\text{relative position changes})) + \text{Sum}(\log \text{likelihood}(\text{absolute position changes})).$$

Usually, any shift of the road network is relatively similar in a given geographic area, and this formula works to shift all location aware device positions in approximately the same way.

Example Uses

1) Wide Turns

Figure 8:
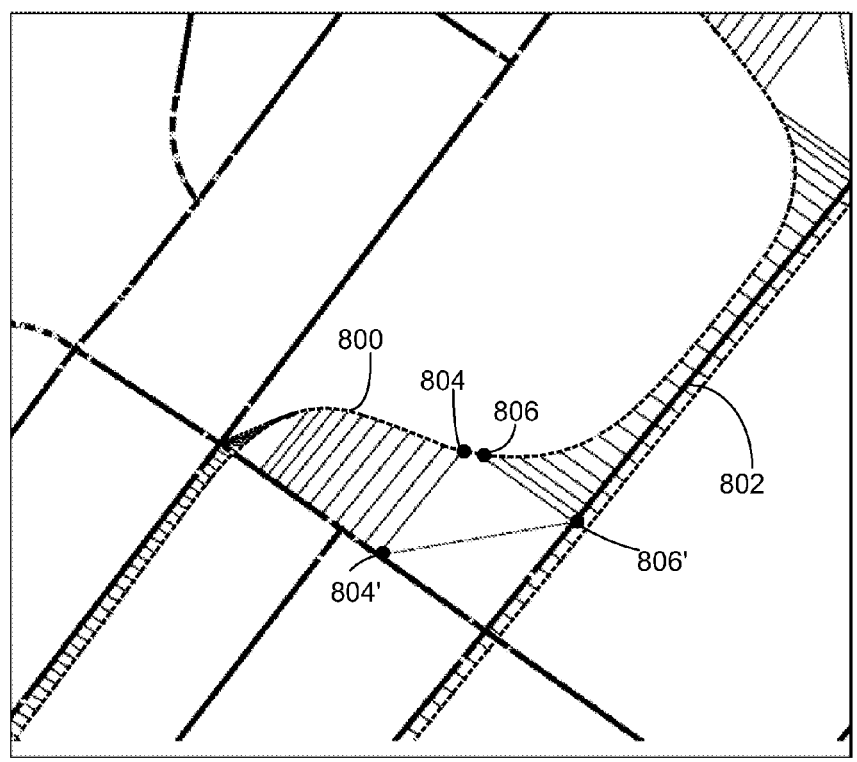
FIG. 8 illustrates an example of the results of a snapping method for a wide turn on a location track, using conventional techniques.
Figure 9:
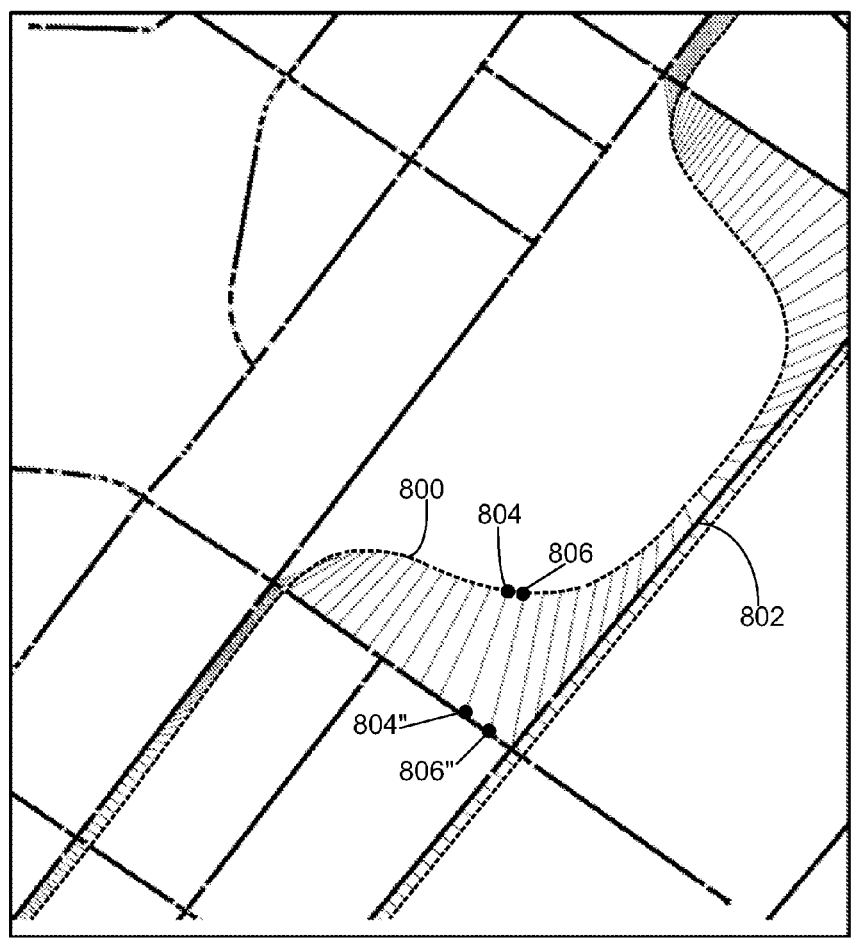
FIG. 9 illustrates an example of the results of a snapping method for a wide turn on a location track, in accordance with an embodiment of the invention.

The methods described herein are useful for snapping location tracks that take wide turns. FIG. 8 shows an example of a location track 800 with a wide turn in which the geographic positions have not been snapped to the correct road segment 802, using conventional techniques, such as using the closest road segment position normal to the location track 800. In particular, note how adjacent positions 804 and 806 have been snapped to positions 804' and 806' on the road segment 802 which are spaced widely apart. Note as well how the positions on road segment 802 are irregularly spaced. FIG. 9 shows an example of this same location track 800 having been correctly snapped to the appropriate road segment using the methods described herein. Note here how positions 804 and 806 have been properly snapped to positions 804" and 806", which are more closely separated. Note as well how the positions on road segment 802 are now more evenly spaced apart.

2) Offset Loops

Figure 10:
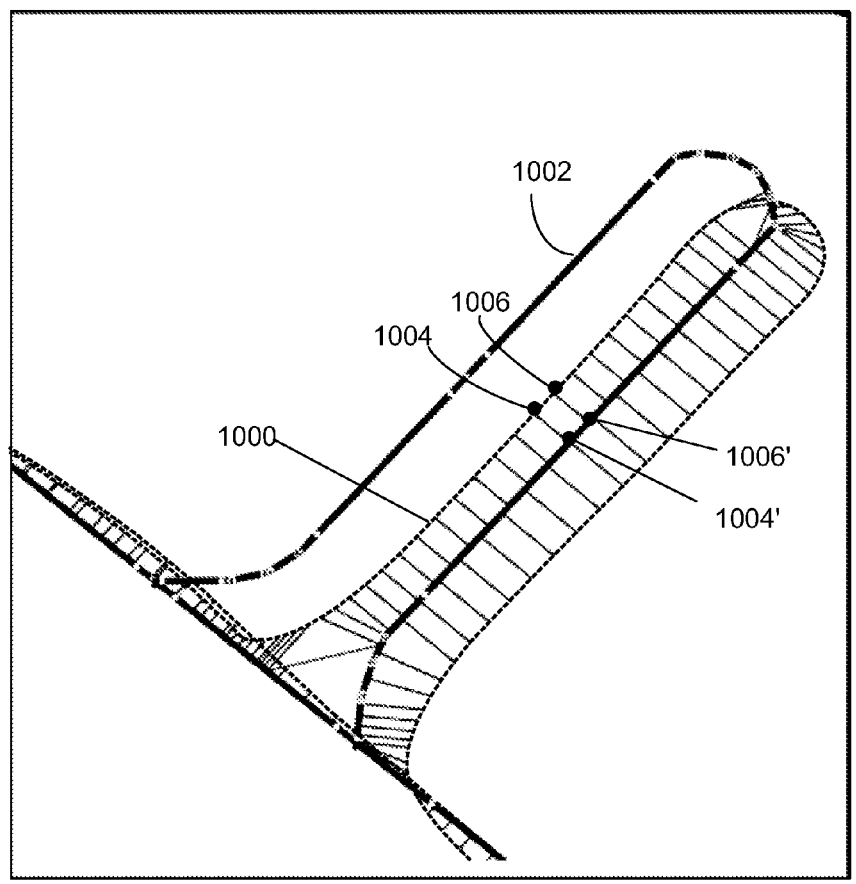
FIG. 10 illustrates an example of the results of a snapping method for an offset loop, using conventional techniques.
Figure 11:
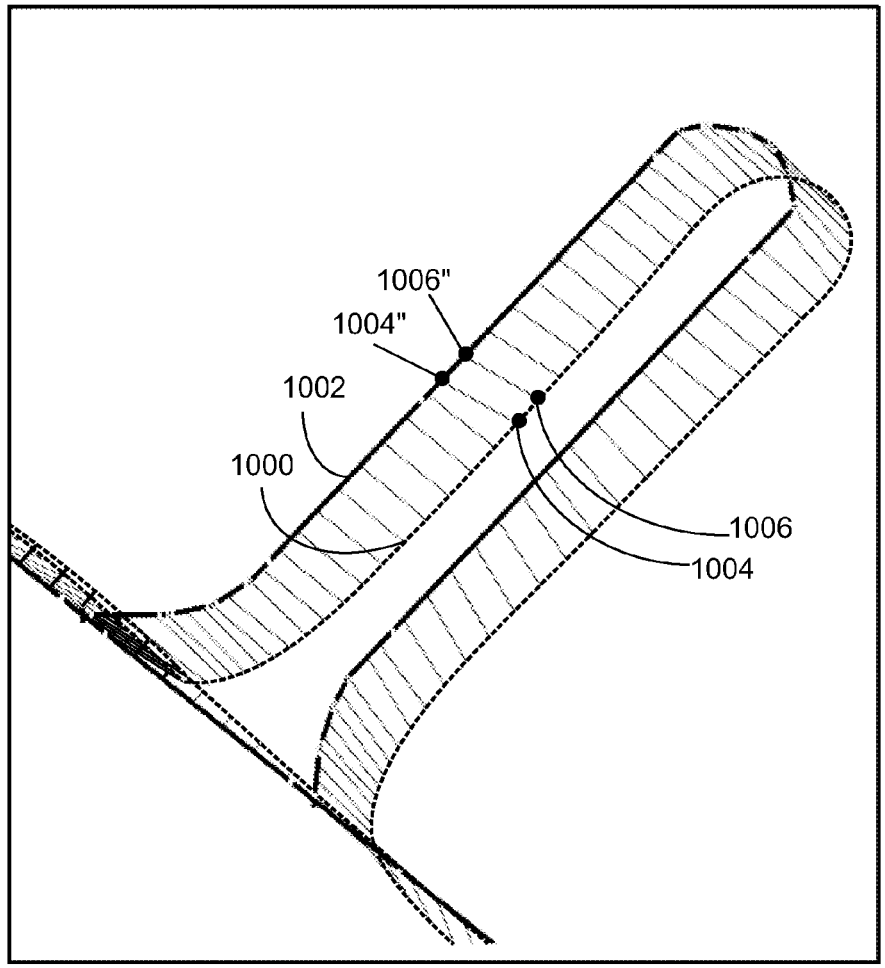
FIG. 11 illustrates an example of the results of a snapping method for an offset loop, in accordance with an embodiment of the invention.

The methods described herein are also useful for snapping offset loops. FIG. 10 shows an example of a location track with an offset loop where the geographic positions have been snapped to the wrong road segment using a conventional approach, such as using the closest road segment position normal to the location track 1000. Positions 1004 and 1006 have been snapped to positions 1004' and 1006' on the road segment 1002, which incorrectly snapped the closest positions on the road segment 1002 to the location track 1000. FIG. 11 shows an example of the same location track 1000 that has been correctly snapped to the road segment 1002 using the methods described above. Note here how positions 1004 and 1006 have been properly snapped to positions 1004" and 1006", which correspond to the heading and most likely path of the location aware device 110 as it traveled along the looped path.

3) Irregular Curves

Figure 12:
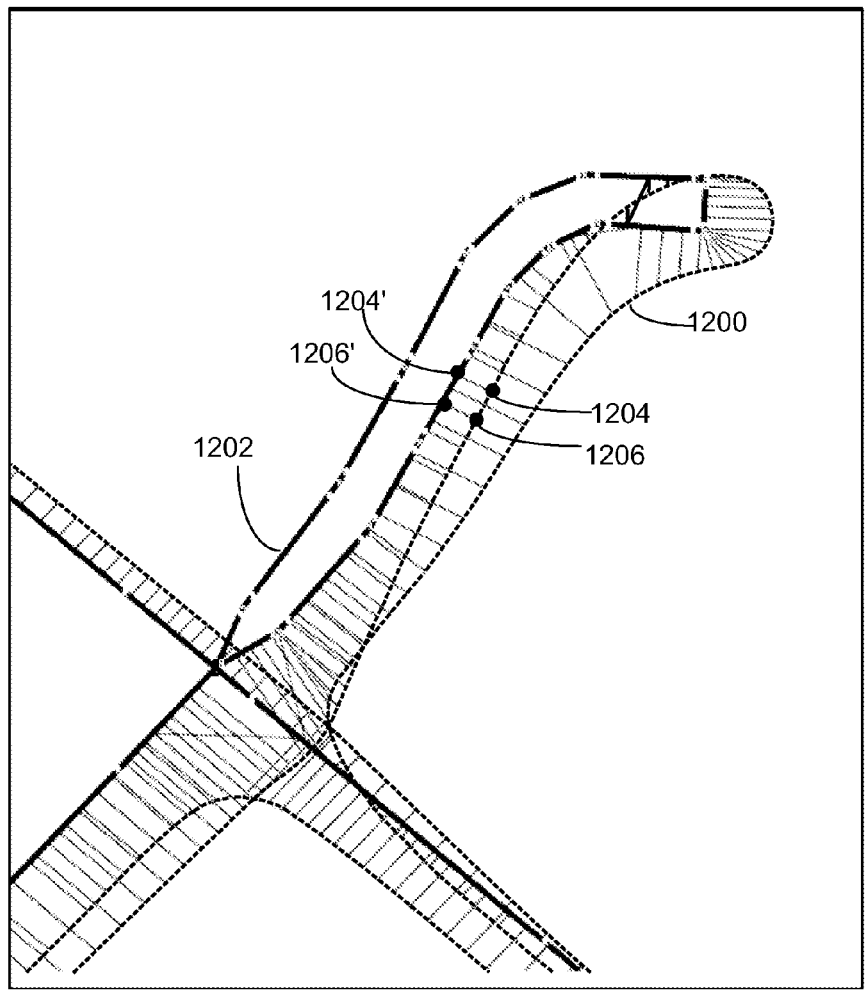
FIG. 12 is an example of the results of a snapping method for an irregular turn, using conventional techniques.
Figure 13:
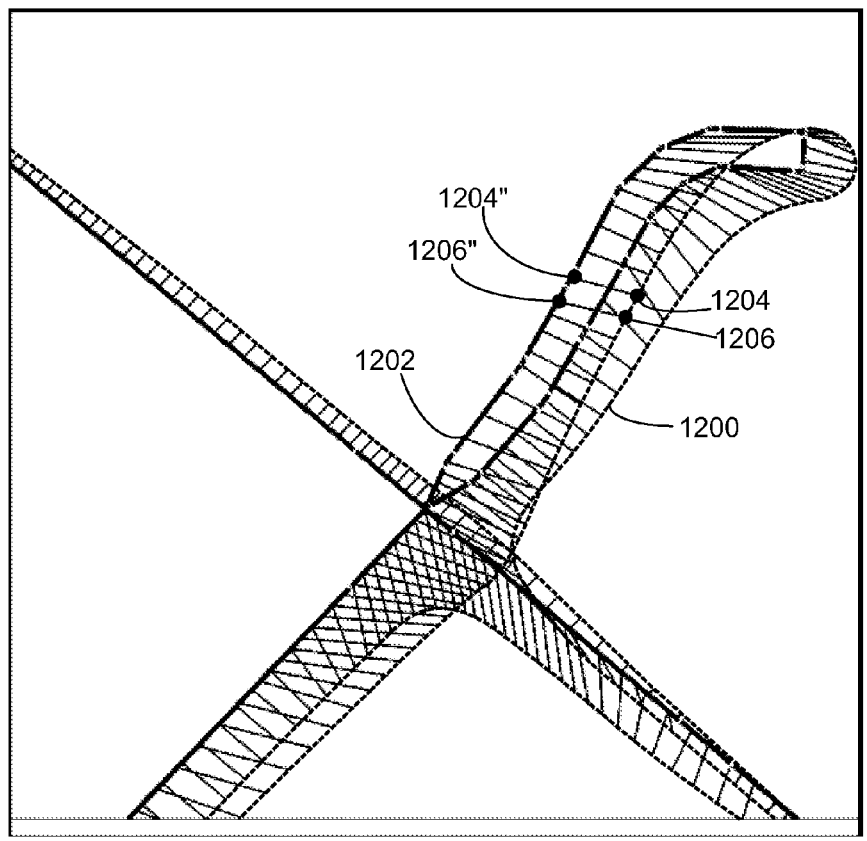
FIG. 13 illustrates an example of the results of a snapping method for an irregular turn, in accordance with an embodiment of the invention.

The methods described herein can also be used for snapping road segments to irregular curves. FIG. 12 shows an example of a location track with an irregular curve in which the geographic positions have not been snapped to the correct road segment using conventional techniques. Note that positions 1204 and 1206 on the location track 1200 have been incorrectly snapped to positions 1204' and 1206' on the closest road segment 1202. FIG. 13 illustrates an example of a location track 1200 that has been correctly snapped to the road segment 1202 using the methods described herein. Note that positions 1204 and 1206 have been properly snapped to positions 1204" and 1206", which correspond to the heading and most likely path of the location aware device 110 as it traveled along the irregularly curved road.

4) Snapping Sensor Data to Roads

Once a likely path on one or more road segments has been established for a given location track, sensor data associated with the geographic positions in the location track can be associated with the road segment. That is, for each item of sensor data that was associated with the geographic positions, it can now be properly associated with the snapped locations on road segments.

For example, a panoramic image taken at the geographic position can be associated with the correct position on a snapped road segment. This enables association of a panoramic image to the correct position on a road, thereby providing an accurate visualization of what the road segment looks like at that position. Pictures of an address or position on a road can be helpful for map and navigation purposes.

Other sensor data can be similarly associated with snapped road segments and then used for analysis. For example, vehicle speeds can be snapped to road segments to provide accurate estimates of historical (or real time) traffic speeds. Historical information can be used to establish speed limits, while real time information can be used for traffic reporting, navigation routing, and identification of traffic patterns.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for snapping a position on a location track to a position on a road segment, the method comprising:
    accessing a location track comprising the plurality of geographic positions, each geographic position including a latitude and a longitude, and obtained from a location aware device;
    for each of the plurality of geographic positions on the location track, determining a likelihood that a geographic position is snapped to a position on a road segment using the likelihoods of snapping all previous geographic positions on the location track to all possible positions on the road segments, wherein the road segment comprises a plurality of positions having a latitude and a longitude;
    determining a most likely snapped position for the last geographic position on the location track received from the location aware device using the likelihoods of snapping all previous geographic positions on the location track to all possible positions on the road segments;
    determining a most likely path of snapped positions on the road segments for all of the geographic positions using the most likely snapped position for the last geographic position on the location track;
    snapping the plurality of geographic positions on the location track to the most likely path of snapped positions on the road segments; and
    storing the most likely snapped positions on the road segments for each of the plurality of geographic positions on the location track.

2. The method of claim 1, wherein determining the likelihood that a geographic position is snapped to a position on a road segment comprises comparing a heading of the geographic position and a heading of the position on the road segment.

3. The method of claim 1, wherein determining the likelihood that a geographic position is snapped to a position on a road segment comprises determining a likelihood of a change in position from a possible previous snapped position to a possible subsequent snapped position.

4. The method of claim 1, further comprising generating multiple threads in parallel on the location track for determining the likelihoods that a plurality of geographic positions are snapped to positions on road segments.

5. The method of claim 4, further comprising determining a most likely path of positions on road segments for all of the geographic positions by combining the calculations of multiple threads on the location track.

6. The method of claim 1, further comprising snapping each of the plurality of geographic positions to the center of the width of the road segment.

7. The method of claim 1, further comprising adjusting the snapping of each of the plurality of geographic positions to the road segment based on the width of the road segment.

8. The method of claim 1, further comprising associating sensor data obtained at the geographic position to the most likely snapped position on the road segment.

9. A non-transitory computer-readable storage medium storing executable computer program instructions for snapping a position on a location track to a position on a road segment, the computer program instructions comprising instructions for:
- accessing a location track comprising the plurality of geographic positions, each geographic position including a latitude and a longitude, and obtained from a location aware device;
- for each of the plurality of geographic positions on the location track, determining a likelihood that a geographic position is snapped to a position on a road segment using the likelihoods of snapping all previous geographic positions on the location track to all possible positions on the road segments, wherein the road segment comprises a plurality of positions having a latitude, a longitude;
- determining a most likely snapped position for the last geographic position on the location track received from the location aware device using the likelihoods of snapping all previous geographic positions on the location track to all possible positions on the road segments;
- determining a most likely path of snapped positions on the road segments for all of the geographic positions using the most likely snapped position for the last geographic position on the location track;
- snapping the plurality of geographic positions on the location track to the most likely path of snapped positions on the road segments; and
- storing the most likely snapped positions on the road segments for each of the plurality of geographic positions on the location track.

10. The computer-readable storage medium of claim 9, wherein determining the likelihood that a geographic position is snapped to a position on a road segment comprises comparing the heading of the geographic position and the heading of the position on the road segment.

11. The computer-readable storage medium of claim 9, wherein determining the likelihood that a geographic position is snapped to a position on a road segment comprises determining a likelihood of a change in position from a possible previous snapped position to a possible subsequent snapped position.

12. The computer-readable storage medium of claim 9, further comprising generating multiple threads in parallel on the location track for determining the likelihoods that a plurality of geographic positions are snapped to positions on road segments.

13. The computer-readable storage medium of claim 9, further comprising determining a most likely path of positions on road segments for all of the geographic positions by combining the calculations of multiple threads on the location track.

14. The computer-readable storage medium of claim 9, further comprising snapping each of the plurality of geographic positions to the center of the width of the road segment.

15. The computer-readable storage medium of claim 9, further comprising adjusting the snapping of each of the plurality of geographic positions to the road segment based on the width of the road segment.

16. The computer-readable storage medium of claim 9, further comprising associating sensor data obtained at the geographic position to the most likely snapped position on the road segment.

17. A method for snapping a position on a location track to a position on a road segment, the method comprising:
- accessing a location track comprising the plurality of geographic positions, each geographic position including a latitude and a longitude, and obtained from a location aware device;
- for one or more geographic positions on the location track, generating one or more worker threads, wherein the one or more worker threads perform steps comprising:
  - determining a likelihood that the geographic position is snapped to a position on a road segment using the likelihoods of snapping a plurality of previous geographic positions on the location track to a plurality of possible positions on the road segment, wherein the road segment comprises a plurality of positions having a latitude and a longitude;
  - determining a plurality of possible snapped positions on the road segment for the geographic position;
- generating a main thread on the location track, wherein the main thread performs steps comprising:
  - determining transitions between the plurality of possible snapped positions generated by the one or more worker threads;
  - determining a most likely snapped position for the last geographic position on the location track received from the location aware device using the likelihoods of snapping the plurality of previous geographic positions on the location track to the plurality of possible positions on the road segments;
  - determining a most likely path of snapped positions on the road segments for all of the geographic positions using the most likely snapped position for the last geographic position on the location track;
  - snapping the plurality of geographic positions on the location track to the most likely path of snapped positions on the road segments; and
  - storing the most likely snapped positions on the road segments for each of the plurality of geographic positions on the location track.

* * * * *